March 15, 1932. C. W. HEWLETT 1,849,831
APPARATUS FOR MEASURING IRREGULARITY OF MOVEMENT
Filed Oct. 31, 1930
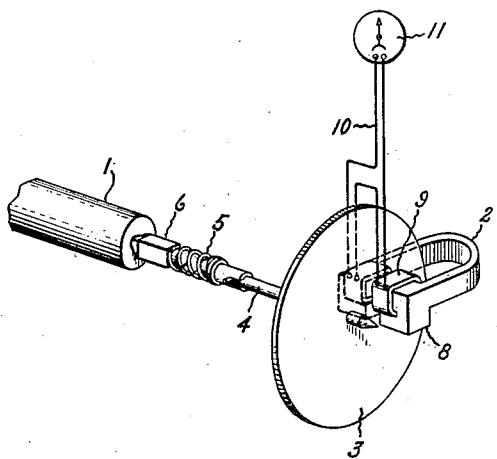
Inventor:
Clarence W. Hewlett,
by Charles E. Tullar
His Attorney.

Patented Mar. 15, 1932

1,849,831

UNITED STATES PATENT OFFICE

CLARENCE W. HEWLETT, OF SCHENECTADY, NEW YORK, ASSIGNOR TO GENERAL ELECTRIC COMPANY, A CORPORATION OF NEW YORK

APPARATUS FOR MEASURING IRREGULARITY OF MOVEMENT

Application filed October 31, 1930. Serial No. 492,531.

My invention relates to apparatus for measuring irregularity of movement. In the construction and use of certain forms of rotating apparatus, such for example as that employed for moving film or disk sound records where a high degree of uniformity of movement is required, it is often desirable to be able to measure any slight deviation or irregularity in the movement of the apparatus. My invention therefore has for its object the provision of improved apparatus for the measurement of irregularity of movement which is simple in construction, efficient in operation, and inexpensive to manufacture.

My invention will be better understood from the following description taken in connection with the accompanying drawing, and its scope will be pointed out in the appended claims.

In the single figure of the drawing which represents one embodiment of my invention I have shown at 1 a shaft whose speed variations are to be measured. The apparatus for measuring the speed variations comprises, the magnet 2 which is illustrated as a permanet magnet but which may be an electromagnet, if desired, between the poles of which the conducting disk 3 mounted on the shaft 4 is adapted to freely rotate. Shaft 4 is adapted to be operatively connected with any shaft whose speed variations are to be measured. In the drawing I have shown shaft 4 provided with a detachable spring connecting means 5 having the pointed end member 6 which may be held in engagement with the center opening in the shaft 1.

In the construction illustrated, the magnet 2 has pole pieces provided with lateral extensions 8 and each pole piece has in its polar face or the side facing the disk, a slot extending in a radial direction with reference to the disk. A winding comprising two similar coils 9 connected together to assist each other is arranged to surround a part only of each pole piece and to interlink a fractional part only of the total flux passing between the pole pieces, namely the flux of that portion of each pole piece at one side of the slot. Each coil 9 has one side lying in the slot and in the form shown surrounds that portion of the pole piece opposite to the extension 8 although if desired the coils may be arranged to surround the other portions of the pole pieces. Connected with the winding by the leads 10 is a suitable electrical measuring instrument 11, such for example as a galvanometer.

When the apparatus is applied to a rotating shaft, such as shown at 1, if the speed of rotation is uniform the flux distribution through the two parts of the magnet pole pieces separated by the slots containing the coils 9 will be constant, and consequently there will be no current induced in the winding. Any sudden increase in the speed of rotation of the disk 3 will cause a change in the flux distribution and a consequent change in the flux interlinking the winding. Hence the galvanometer 11 will swing to one side giving an indication of the current induced in the winding. Likewise any sudden reduction in the speed of disk 3 will cause an opposite change in the flux distribution through the pole pieces and will cause the galvanometer to swing in the opposite direction.

If desired, but one pole piece may be slotted and the winding comprise but one coil, thereby simplifying the apparatus. However, I prefer the double construction shown with identical coils and pole piece structure inasmuch as it counter-balances the effect of any irregularity of movement of the disk such as wobbling due to the disk not being mounted perpendicular to the axis of rotation. The double coil construction furthermore has the advantage of doubling the sensitivity.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Apparatus for measuring irregularity of movement comprising a magnet, a uniform continuous conductor movable past a pole thereof for causing a change in the distribution of the flux thereof, an electrical measuring instrument, and a circuit connection therefor arranged to be variably interlinked by said flux in response to changes in the flux distribution.

2. Apparatus for measuring irregularity of movement comprising a magnet, an armature arranged to move in the flux path between the poles thereof whereby the flux distribution therein is affected by armature reaction, a winding arranged to be variably interlinked in response to changes in said flux distribution, and an electrical measuring device connected with said winding.

3. Apparatus for measuring irregularity of movement comprising a magnet, an armature mounted to rotate between the poles thereof whereby armature reaction causes a change in flux distribution, a winding associated with said poles and arranged to be interlinked by a fractional part only of the flux in said poles, and an electrical measuring instrument connected with said winding.

4. Apparatus for measuring irregularity of movement comprising a magnet, a conducting disk mounted to rotate between the poles thereof, a winding comprising a coil associated with one of the poles, said pole having leading and trailing polar portions and the coil interlinking the flux of one of said portions, and an electrical measuring instrument connected with said winding.

5. Apparatus for measuring the irregularity of movement comprising a rotatably mounted conducting disk adapted to be connected to a member whose speed irregularity is to be measured, a magnet having pole pieces on opposite sides of the disk, each pole piece having a slot in the polar face thereof arranged radially with respect to the disk and forming a plurality of polar portions and having a coil surrounding one of said portions with one side thereof lying in said slot, and an electrical measuring instrument connected in circuit with said coils.

In witness whereof, I have hereunto set my hand this 30th day of October, 1930.

CLARENCE W. HEWLETT.